US012350530B2

(12) United States Patent
Strauss et al.

(10) Patent No.: US 12,350,530 B2
(45) Date of Patent: Jul. 8, 2025

(54) FALL PROTECTION SYSTEM

(71) Applicant: 3M INNOVATIVE PROPERTIES COMPANY, St. Paul, MN (US)

(72) Inventors: Andrew C. Strauss, Goodhue, MN (US); Nicholas G. Bauer, Lake City, MN (US); Michael T. Weiss, Hastings, MN (US); Nathan C. Meyer, Lake City, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 642 days.

(21) Appl. No.: 17/754,958

(22) PCT Filed: Nov. 6, 2020

(86) PCT No.: PCT/IB2020/060468

§ 371 (c)(1),
(2) Date: Apr. 18, 2022

(87) PCT Pub. No.: WO2021/099875

PCT Pub. Date: May 27, 2021

(65) Prior Publication Data

US 2022/0362593 A1 Nov. 17, 2022

Related U.S. Application Data

(60) Provisional application No. 62/938,523, filed on Nov. 21, 2019.

(51) Int. Cl.
*A62B 35/00* (2006.01)

(52) U.S. Cl.
CPC ...... *A62B 35/0068* (2013.01); *A62B 35/0025* (2013.01)

(58) Field of Classification Search
CPC ...... A62B 35/0068; B66F 11/00; B66F 11/04; E04G 21/3238
See application file for complete search history.

(56) References Cited

U.S. PATENT DOCUMENTS 4,015,686 A 4/1977 Bushnell, Jr.
4,096,952 A 6/1978 Diggs
(Continued)

FOREIGN PATENT DOCUMENTS

CA 2644824 A1 5/2010
CH 707440 7/2014
(Continued)

OTHER PUBLICATIONS

International Search Report for PCT Application No. PCT/IB2020/060467 mailed on Feb. 2, 2021, 3 pages.
(Continued)

*Primary Examiner* — Johnnie A. Shablack
(74) *Attorney, Agent, or Firm* — Kenneth B. Wood

(57) ABSTRACT

A fall protection system includes a mast assembly including a fixed mast section, a movable mast section, and a winch assembly. The fall protection system further includes a locking mechanism adapted to lock the movable mast section relative to the fixed mast section. The locking mechanism includes a locking pawl connected to the winch assembly. The locking pawl is adapted to rotate between an engaged position and a disengaged position. The locking pawl engages with the fixed mast section in the engaged position to prevent relative movement between the fixed mast section and the movable mast section. The locking mechanism also includes at least one spring adapted to bias the locking pawl towards the engaged position. Further, the winch assembly is adapted to retain the locking pawl in the disengaged position against the biasing of the at least one
(Continued)

spring based on a tension selectively applied by the winch assembly.

15 Claims, 6 Drawing Sheets

(56) References Cited

U.S. PATENT DOCUMENTS

| | | | |
|---|---|---|---|
| 4,619,346 A | 10/1986 | Deguerry | |
| 6,082,561 A | 7/2000 | Bembas | |
| 7,032,710 B2 | 4/2006 | Anderson et al. | |
| 8,381,879 B2 * | 2/2013 | Griffin | B66F 11/00 254/362 |
| 9,670,980 B2 * | 6/2017 | Jones | F16F 7/087 |
| 10,865,076 B1 * | 12/2020 | Schrank | B66C 23/166 |
| 11,332,208 B2 * | 5/2022 | Hall | B62D 65/022 |
| 11,713,219 B2 * | 8/2023 | Schrank | B66C 23/166 212/300 |
| 11,951,339 B2 * | 4/2024 | Strauss | A62B 35/0068 |
| 12,102,851 B2 * | 10/2024 | Strauss | A62B 35/0068 |
| 2010/0126801 A1 | 5/2010 | Begin et al. | |
| 2012/0228064 A1 | 9/2012 | Busutti et al. | |
| 2015/0375020 A1 | 12/2015 | Palet | |
| 2017/0370114 A1 | 12/2017 | Kornijenko et al. | |
| 2018/0126198 A1 | 5/2018 | Troy et al. | |
| 2022/0362593 A1 * | 11/2022 | Strauss | A62B 35/0025 |
| 2023/0010425 A1 * | 1/2023 | Russell | E05C 3/14 |
| 2025/0001223 A1 * | 1/2025 | Yousef | A62B 35/0081 |

FOREIGN PATENT DOCUMENTS

| | | |
|---|---|---|
| CN | 104229691 | 12/2012 |
| CN | 207313800 U | 5/2018 |
| EP | 0517997 B1 | 12/1994 |
| EP | 2999523 B1 | 4/2017 |
| FR | 2968325 B1 | 8/2013 |
| GB | 1499695 | 2/1978 |
| JP | 2011177375 | 9/2011 |
| WO | 2003018459 A1 | 3/2003 |
| WO | 2014189512 A1 | 11/2014 |
| WO | 2021099874 A1 | 5/2021 |
| WO | 2021099876 A1 | 5/2021 |

OTHER PUBLICATIONS

International Search Report for PCT Application No. PCT/IB2020/060468 mailed on Feb. 2, 2021, 3 pages.

International Search Report for PCT Application No. PCT/IB2020/060469 mailed on Feb. 16, 2021, 3 pages.

* cited by examiner

FALL PROTECTION SYSTEM

TECHNICAL FIELD

The present disclosure relates to a fall protection system.

BACKGROUND

As per regulations applied on construction, industrial, maintenance, and allied industries, it is essential to employ a system that protects personnel from falling when personnel perform operations at elevated locations. In order to comply with such regulations, industries take various measures to ensure protection of personnel operating at the worksites. Typically, a fall protection system is used at the worksite when personnel perform work operations at the elevated locations. The fall protection system is transportable from one place to another by a conveying apparatus, such as a forklift, as per requirements. Further, the fall protection system typically includes a base assembly, a mast assembly, and a jib portion. A personnel is tethered to the jib portion using one or more cables in order to ensure fall protection. It is desirable that the fall protection system is lightweight, easy to install and transport, and provides improved reliability in operation.

SUMMARY

Generally, the present disclosure relates to a fall protection system and a method of operating the fall protection system.

Some embodiments of the present disclosure relate to a fall protection system. The fall protection system includes a mast assembly including a fixed mast section and a movable mast section. The fall protection system also includes a winch assembly operably connected to the movable mast section. The fall protection system further includes a locking mechanism adapted to lock the movable mast section relative to the fixed mast section. The locking mechanism includes a locking pawl connected to the winch assembly. The locking pawl is adapted to rotate between an engaged position and a disengaged position. The locking pawl engages with the fixed mast section in the engaged position to prevent relative movement between the fixed mast section and the movable mast section. The locking mechanism also includes at least one spring adapted to bias the locking pawl towards the engaged position. Further, the winch assembly is adapted to retain the locking pawl in the disengaged position against the biasing of the at least one spring based on a tension selectively applied by the winch assembly.

In some embodiments, the winch assembly includes a cable that selectively applies the tension by the winch assembly.

In some embodiments, the at least one spring is adapted to allow the locking pawl to rotate to the engaged position based on at least a decrease in the tension selectively applied by the cable.

In some embodiments, the fall protection system further includes a mounting structure. The locking pawl and the at least one spring are connected to the mounting structure.

In some embodiments, the mounting structure is fixedly connected to the movable mast section.

In some embodiments, the fixed mast section includes at least one recess disposed on an outer surface thereof. The locking pawl engages with the at least one recess in the engaged position.

In some embodiments, the at least one recess includes a plurality of recesses arranged equidistantly on the outer surface of the fixed mast section.

In some embodiments, the movable mast section is movable based on an operation of the winch assembly.

In some embodiments, the at least one spring includes a pair of springs.

In some embodiments, the at least one spring is a torsion spring.

Some embodiments of the present disclosure relate to a fall protection system. The fall protection system includes a mast assembly including a fixed mast section and a movable mast section. The fall protection system also includes a winch assembly operably connected to the movable mast section. The fall protection system further includes a locking mechanism adapted to lock the movable mast section relative to the fixed mast section. The locking mechanism includes a locking pawl connected to the winch assembly. The locking pawl is adapted to rotate between an engaged position and a disengaged position. The locking pawl engages with the fixed mast section in the engaged position to prevent relative movement between the fixed mast section and the movable mast section. The locking mechanism also includes at least one spring adapted to bias the locking pawl towards the engaged position. The locking mechanism further includes a winch assembly connected to the locking pawl. The winch assembly is adapted to retain the locking pawl in the disengaged position against the biasing of the at least one spring based on a tension selectively applied by the winch assembly. Further, the at least one spring is adapted to allow the locking pawl to rotate to the engaged position based on at least a decrease in the tension selectively applied by the cable.

Some embodiments of the present disclosure relate to a method of operating a fall protection system including a fixed mast section and a movable mast section. The method includes connecting, operably, a winch assembly to the movable mast section. The method also includes applying, selectively, a tension on a cable wrapped around the winch assembly to move the movable mast section relative to the fixed mast section. The method further includes retaining a locking pawl connected to the winch assembly in a disengaged position by the tension selectively applied on the cable. Further, in the disengaged position, the locking pawl is disengaged from the fixed mast section to allow relative movement between the fixed mast section and the movable mast section. The method includes rotating the locking pawl from the disengaged position to an engaged position in response to at least a decrease in the tension selectively applied on the cable. Further, in the engaged position, the locking pawl is engaged with the fixed mast section to prevent relative movement between the fixed mast section and the movable mast section.

Some embodiments of the present disclosure relate to a fall protection system. The fall protection system includes a mast assembly including a fixed mast section and a movable mast section adapted to move relative to the fixed mast section for adjusting a height of the mast assembly. The fall protection system also includes a primary mechanism adapted to at least one of move the movable mast section relative to the fixed mast section and lock the movable mast section relative to the fixed mast section. The primary mechanism selectively applies a tension on the movable mast section when the movable mast section is locked with the fixed mast section to prevent relative movement between the fixed mast section and the movable mast section. The fall protection system further includes a secondary mechanism adapted to lock the movable mast section relative to the fixed mast section based on at least a decrease in the tension selectively applied by the primary mechanism.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a fall protection system having a base assembly, a height adjustable mast assembly, a jib connected to a portion of the mast assembly, and a counterweight. The height adjustable mast assembly includes a fixed mast section and a movable mast section that may be moved relative to the fixed mast section. As per requirements, the movable mast section may be locked with the fixed mast section. Further, the mast assembly can be locked with the base assembly. The fall protection system may be used to arrest or prevent falling of a personnel operating at any worksite or industry.

The term "aligned" as used herein refers to angular alignment between a first component and a second component. In case the first component is a projection or a tab, and the second component defines a complementary opening, groove, or slot, the first component can be at least partially received within the second component when the first and second components are aligned with each other. In cases the first and second components are misaligned with each other, the first component cannot be received in the second component. In some cases, the first and second components can be axially spaced apart from each other when they are aligned.

Figure 1:
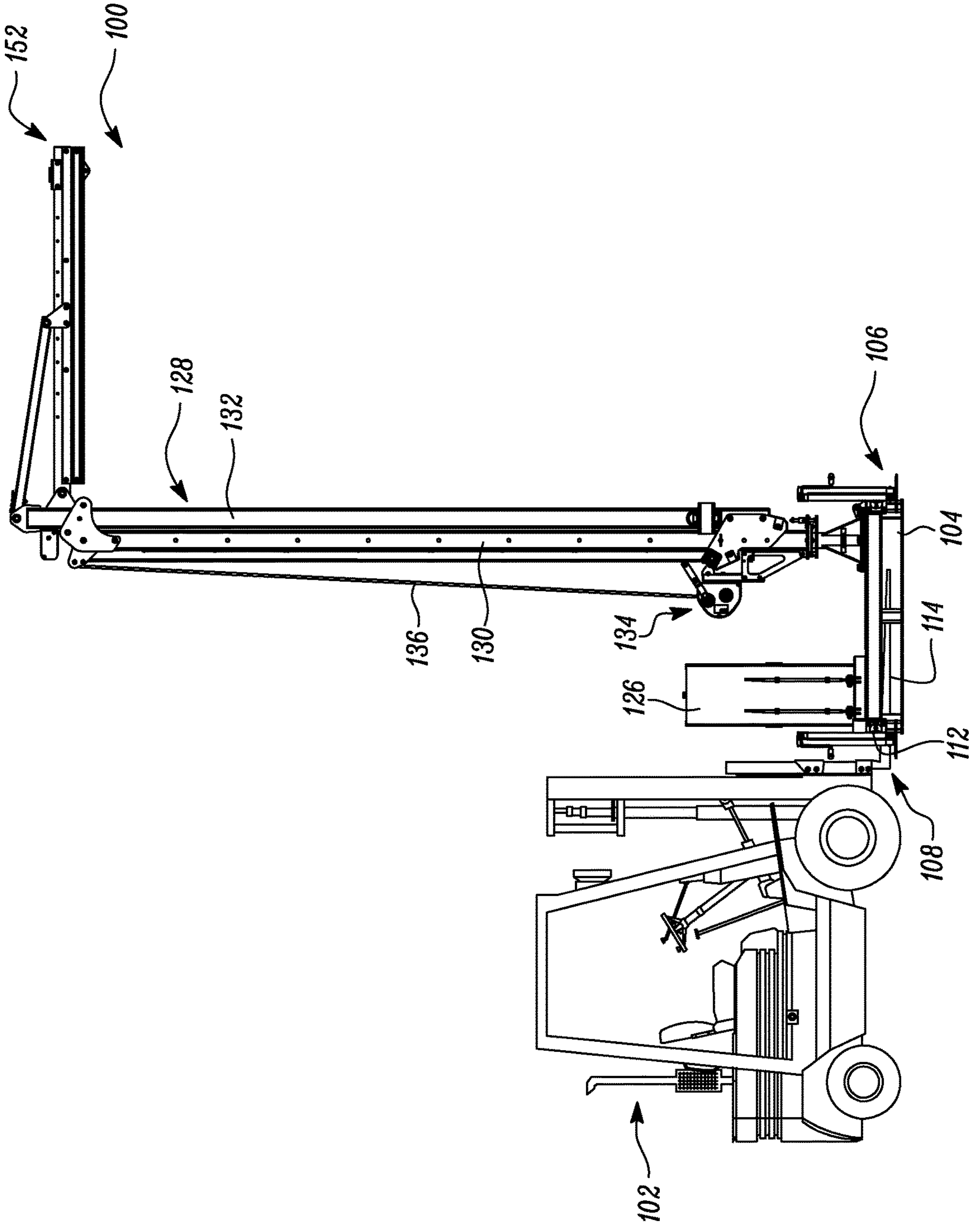
FIG. 1 is a side view of a fall protection system received by a conveying apparatus for transportation according to an embodiment of the present disclosure.

FIG. 1 illustrates an exemplary fall protection system 100. The fall protection system 100 may be used in industries, such as, construction, industrial, maintenance, and the like. The fall protection system 100 is transportable from one location to another as per application requirements. For this purpose, the fall protection system 100 is receivable by a conveying apparatus 102. The conveying apparatus 102 may include a forklift, a hand truck, or any other conveying apparatus that may be used to facilitate transportation of the fall protection system 100 from one location to another.

The fall protection system 100 includes a base plate 104 defining a first side 106 and a second side 108 defined opposite to the first side 106. Further, a first surface 110 (shown in FIG. 2) is defined at the first side 106 and a second surface 112 is defined at the second side 108. The base plate 104 is generally rectangular in shape. Alternatively, the base plate 104 may be square in shape. Further, the base plate 104 of the fall protection system 100 is receivable by the conveying apparatus 102. In an example, the base plate 104 may include one or more ports (not shown) to receive arms 114 of the conveying apparatus 102.

Figure 2:
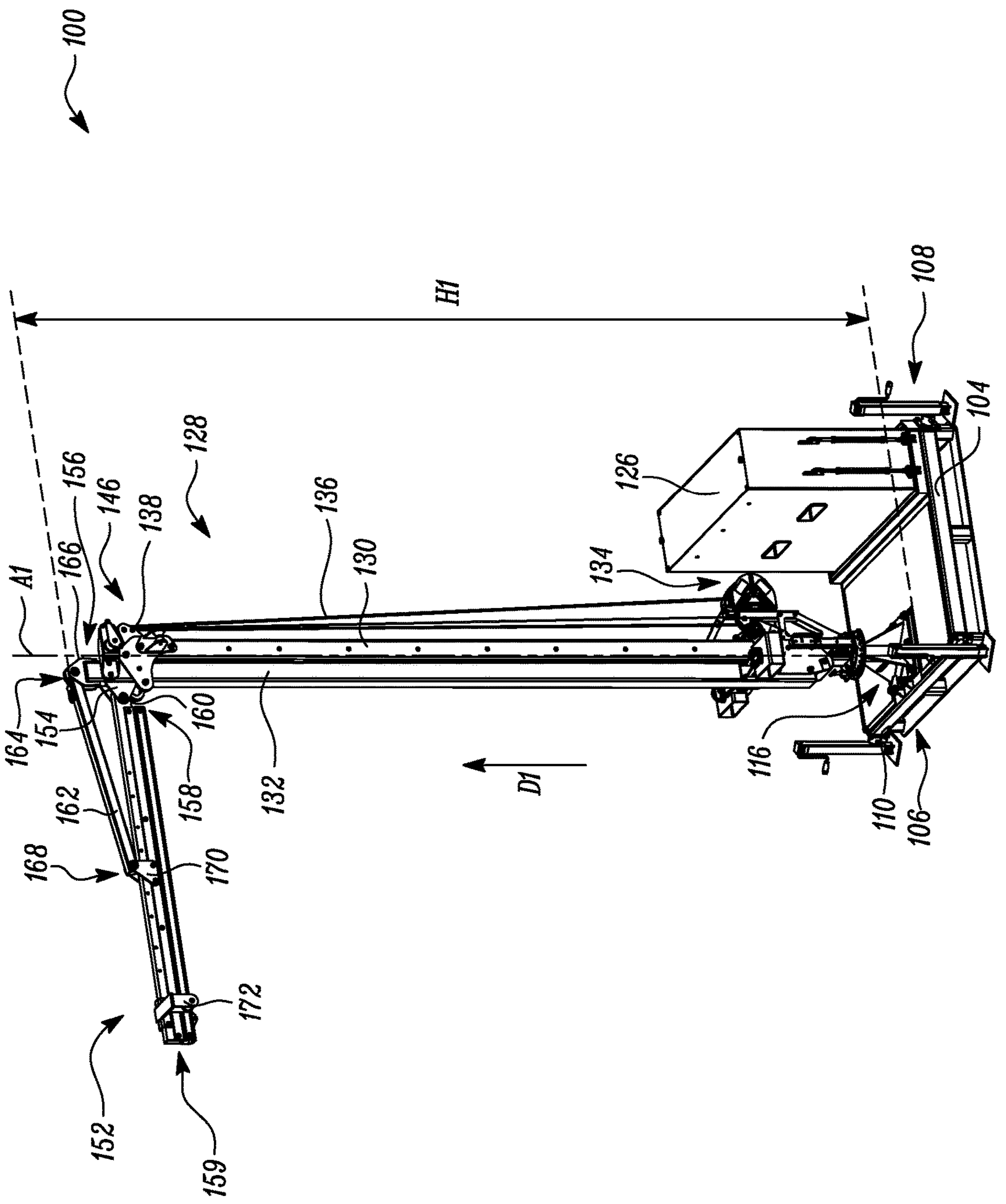
FIG. 2 is a perspective view of the fall protection system shown in FIG. 1.

As shown in FIG. 2, a base assembly 116 is connected to the base plate 104. It should be noted that the base assembly 116 is pivotably connected to base plate 10, such that the base assembly, a mast assembly 128, and a jib 152 of the fall protection system 100 can be pivoted relative to the base plate 104, as per requirements. As such, the base assembly 116 is pivotable about pivot points 118 (shown in FIG. 3). Further, the base assembly 116 is coupled proximate to the first side 106 of the base plate 104 using a number of mechanical fasteners 120 (shown in FIG. 3). More particularly, a plate 122 (shown in FIG. 3) of the base assembly 116 is removably coupled to the base plate 104. The mechanical fasteners 120 may include bolts, screws, and the like. The mechanical fasteners 120 may be removed in order to facilitate pivoting of the base assembly 116 during tip-up installations or transportation. Further, a counterweight 126 is connected to the base plate 104.

The fall protection system 100 includes the mast assembly 128 connected to the base plate 104 disposed proximate to the first side 106 of the base plate 104. More particularly, the mast assembly 128 is connected to the base plate 104 by the base assembly 116. The mast assembly 128 is rotatable about a first axis "A1" defined by the mast assembly 128. The mast assembly 128 includes a fixed mast section 130 and a movable mast section 132. The movable mast section 132 is adapted to move relative to the fixed mast section 130 for adjusting a height "H1" of the mast assembly 128. Accordingly, the movable mast section 132 may be moved relative to the fixed mast section 130 so that the height "H1" of the mast assembly 128 may be varied, as per application requirements. The movable mast section 132 may move along a first direction "D1" to increase the height "H1" of the mast assembly 128 and move in a direction that is opposite to the first direction "D1" to decrease the height "H1" of the mast assembly 128. In other words, the movable mast section 132 is extendable and retractable with respect to the base plate 104. Further, in a stowed position of the fall protection system 100, the movable mast section 132 may be in a fully retracted position. When the fall protection system 100 is in use, the movable mast section 132 may extend with respect to the base plate 104 based on relative movement between the movable mast section 132 and the fixed mast section 130. The fixed and movable mast sections 130, 132 may include hollow square-shaped tubes, without any limitations.

Figure 3:
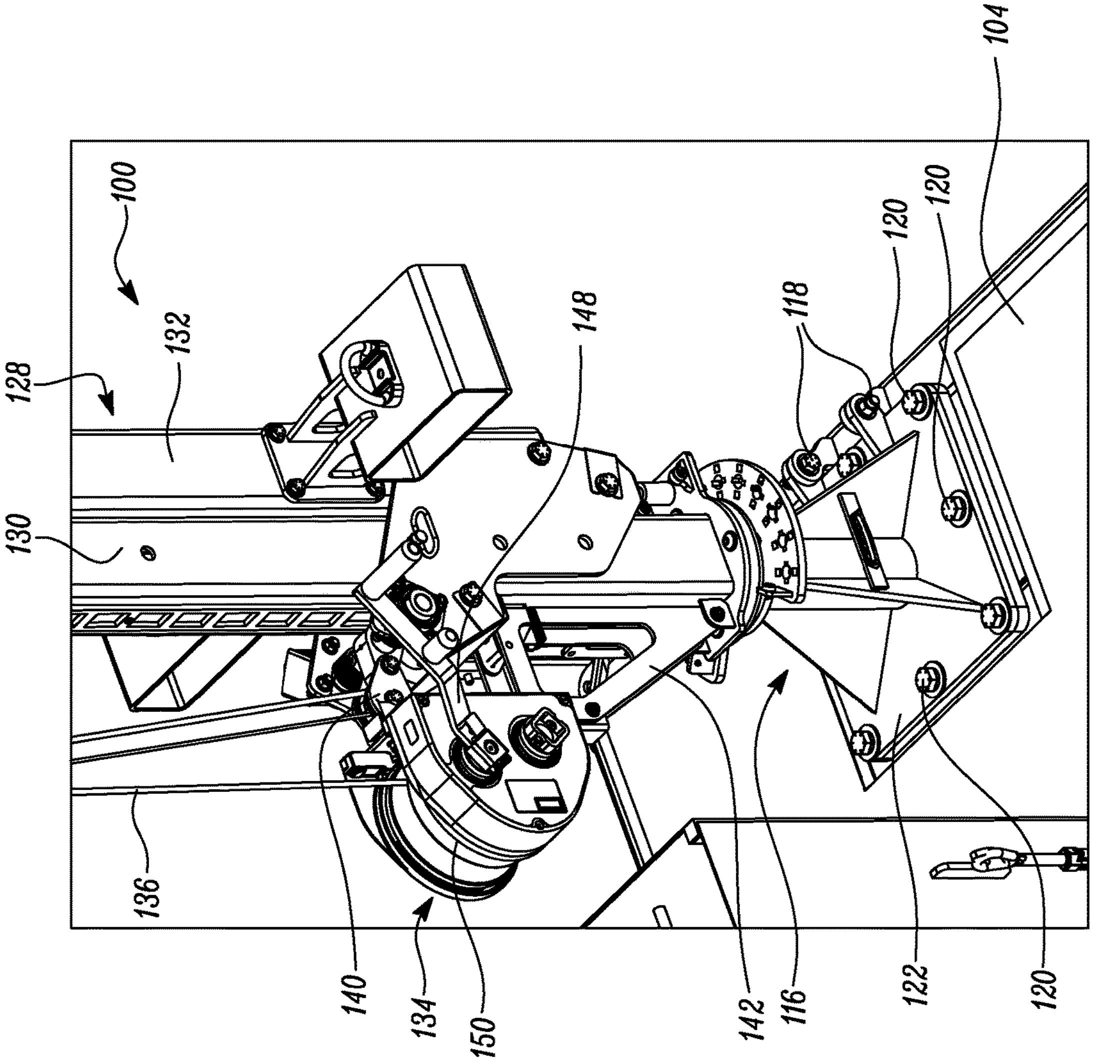
FIG. 3 is a perspective view illustrating a primary mechanism associated with the fall protection system shown in FIG. 1.

Referring to FIG. 3, a primary mechanism 134 is associated with the fall protection system 100. In an example, the primary mechanism 134 is embodied as a winch assembly. The primary mechanism 134 may be hereinafter interchangeably referred to as the winch assembly 134. The winch assembly 134 is operably connected to the movable mast section 132. More particularly, the winch assembly 134 is operably connected to the movable mast section 132 to move the movable mast section 132 relative to the fixed mast section 130. Further, the winch assembly 134 is connected to the fixed mast section 130 via a bracket 142. The movable mast section 132 is movable based on an operation of the winch assembly 134. The winch assembly 134 includes a cable 136. The winch assembly 134 is adapted to at least one of move the movable mast section 132 relative to the fixed mast section 130 and lock the movable mast section 132 relative to the fixed mast section 130. The winch assembly 134 selectively applies a first tension "T1" on the movable mast section 132 to move the movable mast section 132 relative to the fixed mast section 130 in order to raise the height "H1" of the mast assembly 130. Moreover, the winch assembly 134 selectively applies a second tension "T2" on the movable mast section 132 when the movable mast section 132 is locked with the fixed mast section 130 to prevent relative movement between the fixed mast section 130 and the movable mast section 132. The second tension "T2" is hereinafter interchangeably referred to as the tension "T2".

Further, the winch assembly 134 includes the cable 136 that selectively applies the tension "T2" by the winch assembly 134. More particularly, the cable 136 is adapted to selectively apply the tension "T2" on the movable mast section 132 to prevent relative movement between the fixed mast section 130 and the movable mast section 132. Further, the cable 136 is adapted to selectively allow relative movement between the fixed mast section 130 and the movable mast section 132. More particularly, the cable 136 selectively applies the first tension "T1" to move the movable mast section 132 relative to the fixed mast section 130. The winch assembly 134 includes a first pulley (not shown) coupled with the fixed mast section 130 by a bracket 138, a second pulley 140, and a winch drum 150. The cable 136 is routed through the first pulley and the second pulley 140 such that one end of the cable 136 is terminated at an upper end 146 of the fixed mast section 130. The winch assembly 134 may be operated manually or using a power drill (not shown).

Further, the winch assembly 134 includes a handle 148. When the winch assembly 134 is manually operated, a personnel rotates the handle 148 which in turn rotates the winch drum 150 through a series of gears (not shown). The rotation of the winch drum 150 causes the cable 136 to retract or wind around the winch drum 150. The retraction of the cable 136 around the winch drum 150 causes the movable mast section 132 to move along the first direction "D1" (shown in FIG. 2) thereby raising the height "H1" of the mast assembly 128. Further, the winch assembly 134 applies the tension "T2" on the movable mast section 132 to retain the movable mast section 132 in a stationary position. More particularly, the winch assembly 134 locks the movable mast section 132 with the fixed mast section 130 in order to eliminate any relative movement between the fixed mast section 130 and the movable mast section 132. In an example, the winch assembly 134 may include a brake mechanism (not shown) that restricts any further winding of the cable 136 around the winch drum 150 thereby restricting any relative movement between the movable mast section 132 and the fixed mast section 130. It should be noted that the movable mast section 132 is held in the stationary position based on the second tension "T2" applied by the winch assembly 134. Further, an unwinding of the cable 136 causes the movable mast section 132 to move in the direction that is opposite to the first direction "D1" thereby reducing the height "H1" of the mast assembly 128.

When the winch assembly 134 is operated by the power drill, the handle 148 is replaced by a clutch adapter. The clutch adapter is coupled to a powered drive hub of the winch assembly 134. The power drill is then attached to an input shaft of the clutch adapter. When the power drill is activated, the input shaft is rotated which rotates the winch drum 150 through the series of gears and the cable 136 is retracted around the winch drum 150 thereby raising the height "H1" of the mast assembly 128.

As shown in FIG. 2, the fall protection system 100 also includes a jib 152 inclined with respect to the mast assembly 128 and pivotably connected to the mast assembly 128. More particularly, the jib 152 is pivotably connected to the movable mast section 132. In the illustrated embodiment, the jib 152 is substantially perpendicular to the movable mast section 132. The jib 152 defines a first end 158 and a second end 159. A first bracket member 154 is fixedly connected at an upper portion 156 of the movable mast section 132. The first end 158 of the jib 152 is connected to the first bracket member 154 such that the jib 152 is pivotably connected at a pivot point 160. The first bracket member 154 may include bearings and a shaft that facilitates pivoting of the jib 152 relative to the movable mast section 132. In some examples, the jib 152 may include one or more telescopic arms, without any limitations. Further, when the fall protection system 100 is assembled, the jib 152 is held perpendicular to the mast assembly 128 by a bar 162. A first end 164 of the bar 162 is pivotably connected to the movable mast section 132 by a second bracket member 166. A second end 168 of the bar 162 is connected to the jib 152 by a third bracket member 170.

In an example, the jib 152 includes an anchor point 172. As illustrated in FIG. 2, the anchor point 172 is connected to the second end 159 of the jib 152. The anchor point 172 provides a point at which one end of a securing device, such as a cable, a harness, or any other such device, may be secured to the fall protection system 100. Another end of the securing device is secured to the personnel to provide fall protection to the personnel. In other examples, a location of the anchor point 172 may vary, as per requirements. For example, the jib 152 may include a track (not shown) secured to an underside of the jib 152. A trolley (not shown) may be slidably or rollably connected to the track such that the anchor point 172 is connected to the trolley in order to vary the location of the anchor point 172.

Figure 4:
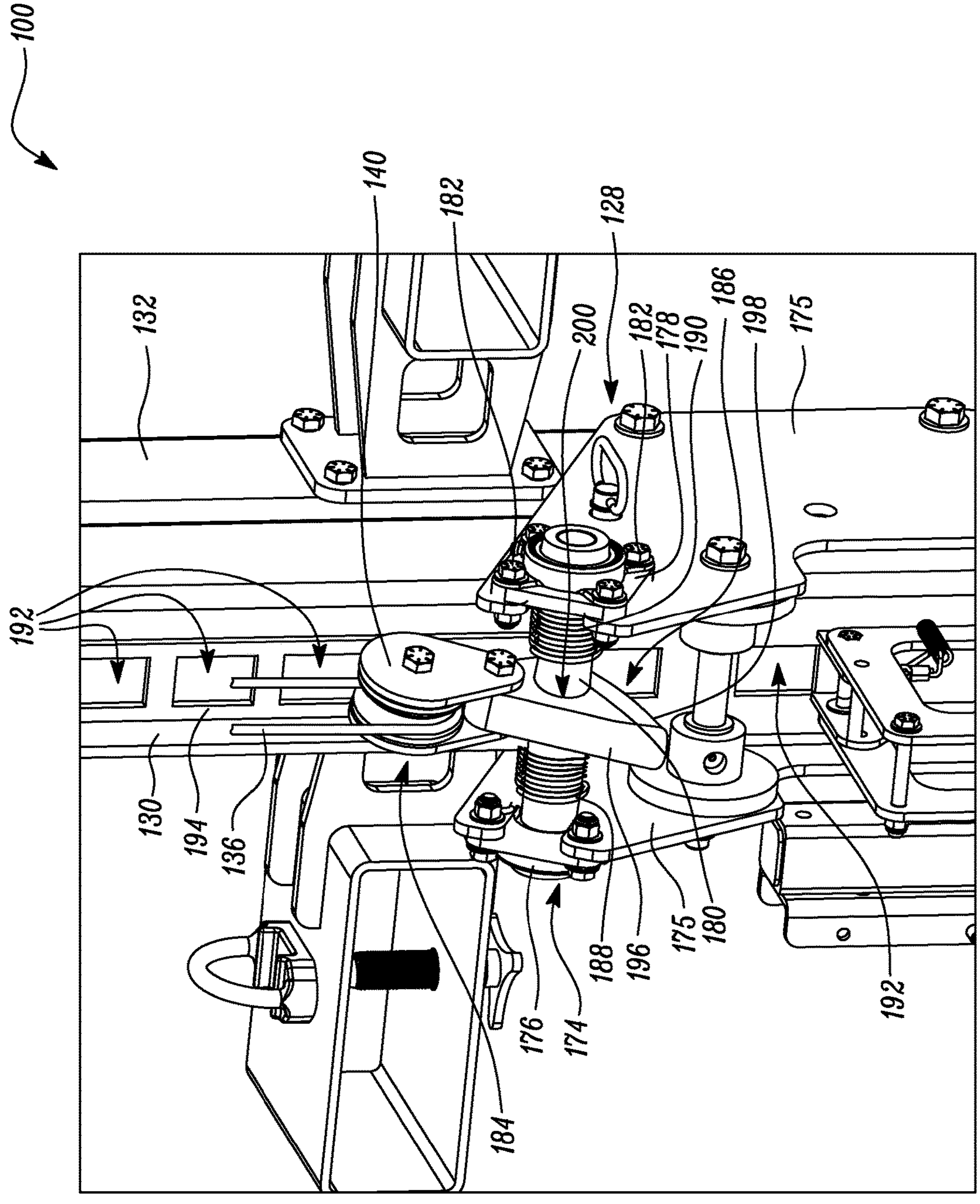
FIG. 4 is a perspective view illustrating a locking pawl of the fall protection system in a disengaged position.

As shown in FIG. 4, the fall protection system 100 includes a mounting structure 174. The mounting structure 174 is fixedly connected to the movable mast section 132. More particularly, a pair of plates 175 couple the mounting structure 174 to the movable mast section 132. The mounting structure 174 includes a first bracket 176, a second bracket 178, and a shaft 180 extending between the first and second brackets 176, 178. The first and second brackets 176, 178 are connected to the respective plates 175 using mechanical fasteners 182. The mechanical fasteners 182 may include bolts, screws, pins, and the like. A locking pawl 186 and at least one spring 188, 190 are connected to the mounting structure 174. Further, the fall protection system 100 includes a secondary mechanism 184 adapted to lock the movable mast section 132 relative to the fixed mast section 130 based on at least a decrease in the tension "T2" selectively applied by the primary mechanism 134 (see FIG. 3). More particularly, the secondary mechanism 184 is embodied as a locking mechanism. The secondary mechanism 184 will be hereinafter interchangeably referred to as the locking mechanism 184.

The locking mechanism 184 is adapted to lock the movable mast section 132 relative to the fixed mast section 130. The locking mechanism 184 is embodied as a back-up locking mechanism that operates in instances wherein the primary mechanism 134 fails. In some embodiments, the locking mechanism 184 locks the movable mast section 132 with the fixed mast section 130 only when the tension "T2" applied by the locking mechanism 184 decreases below a predetermined threshold. More particularly, in some situations, there may be a small decrease in the tension "T2" applied by the locking mechanism 184 due to play between various components of the fall protection system 100. Such a nominal decrease in the tension "T2" may not be due to the failure of the primary mechanism 134, hence the locking mechanism 184 is adapted to lock the movable mast section 132 with the fixed mast section 130 only when the tension "T2" applied by the locking mechanism 184 decreases below the predetermined threshold. In some embodiments, the predetermined threshold can be greater than or equal to zero.

Further, the locking mechanism 184 includes the locking pawl 186 connected to the winch assembly 134. The locking pawl 186 is connected to the winch assembly 134 (see FIG. 3) by the cable 136. The locking pawl 186 is adapted to rotate between an engaged position and a disengaged position. Further, the locking pawl 186 engages with the fixed mast section 130 in the engaged position to prevent relative movement between the fixed mast section 130 and the movable mast section 132. More particularly, the fixed mast section 130 includes at least one recess 192 disposed on an outer surface 194 thereof. The locking pawl 186 engages with the at least one recess 192 in the engaged position. In the illustrated example, the at least one recess 192 includes a plurality of recesses 192 arranged equidistantly on the outer surface 194 of the fixed mast section 130. The recesses 192 are generally rectangular is shape.

Further, in the disengaged position of the locking pawl 186, the locking pawl 186 is separated from the fixed mast section 130. The locking pawl 186 includes the second pulley 140 and a lever 196. The locking mechanism 184 includes the second pulley 140 connected to the locking pawl 186. Further, an end of the lever 196 defines a teeth 198. A shape of the teeth 198 compliments the shape of the recesses 192 so that the teeth 198 can engage with the recesses 192. Further, the lever 196 defines a through opening 200. The through opening 200 receives a portion of the shaft 180 therethrough in order to fixedly connect the shaft 180 with the locking pawl 186 such that the locking pawl 186 is rotated between the engaged position and the disengaged position with the shaft 180.

The locking mechanism 184 also includes the at least one spring 188, 190 adapted to bias the locking pawl 186 towards the engaged position. The at least one spring 188, 190 is a torsion spring. More particularly, the at least one spring 188, 190 is embodied as a helical torsion spring. In the illustrated example, the at least one spring 188, 190 includes a pair of springs 188, 190. The pair of springs 188, 190 are disposed around the shaft 180 at either sides of the lever 196 and are adapted to rotate the shaft 180 based on twisting and untwisting thereof. A hooked end of each of the pair of springs 188, 190 may be secured around a corresponding tab extending from the shaft 180. Further, an opposite end of each of the pair of springs 188, 190 may be secured to a corresponding fastener 182 connected to the respective first and second brackets 176, 178. The springs 188, 190 can therefore twist relative to the respective first and second brackets 176, 178 and apply a torque on the shaft 180.

The winch assembly 134 is adapted to retain the locking pawl 186 in the disengaged position against the biasing of the at least one spring 188, 190 based on the tension "T2" selectively applied by the winch assembly 134. More particularly, the springs 188, 190 are retained in a twisted condition when the locking pawl 186 is in the disengaged position. Further, the at least one spring 188, 190 is adapted to allow the locking pawl 186 to rotate to the engaged position based on at least a decrease in the tension "T2" selectively applied by the cable 136. More particularly, when the tension "T2" reduces below the predetermined threshold, the springs 188, 190 untwist and apply the torque to bias the locking pawl 186 to the engaged position.

Referring to FIG. 3, when the height "H1" (see FIG. 2) of the mast assembly 128 needs to be increased, the handle 148 is operated to wind the cable 136 around the winch drum 150. The winding of the cable 136 applies the first tension "T1" on the movable mast section 132 due to which the movable mast section 132 moves in the first direction "D1" (see FIG. 2). Further, when the height "H1" of the mast assembly 128 is adjusted to the height "H1" that may be desired for a specific application, the movable mast section 132 is locked with the fixed mast section 130 based on the second tension "T2" applied by the winch assembly 134. It should be noted that the movable mast section 132 is held in the locked position unless the winch assembly 134 is operated again to move the movable mast section 132.

Figure 5:
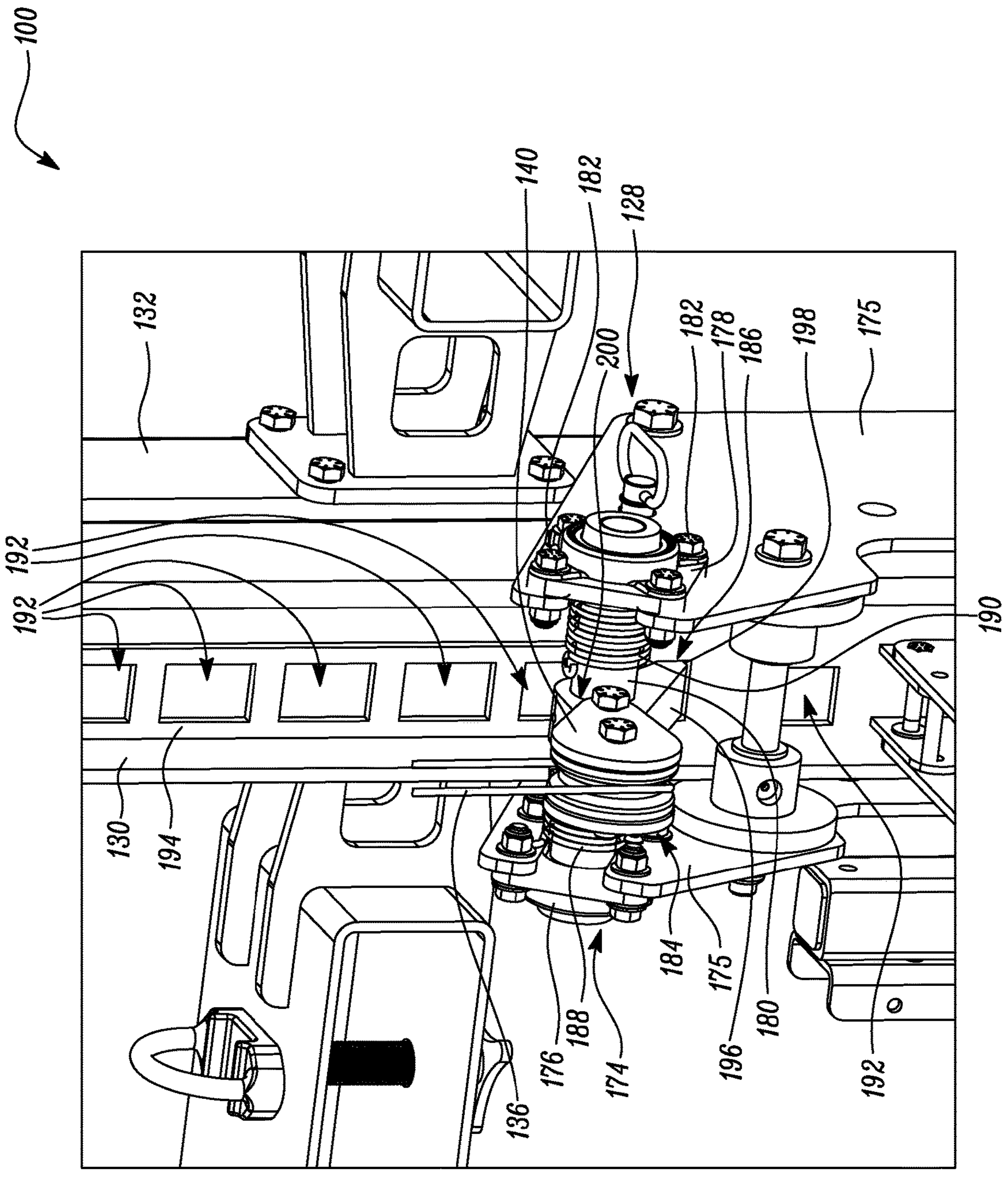
FIG. 5 is a perspective view illustrating the locking pawl of FIG. 4 in an engaged position.

Referring to FIG. 5, in some situations, when the primary mechanism 134 (see FIG. 3) fails, the locking pawl 186 rotates from the disengaged position to the engaged position. More particularly, as the tension "T2" in the cable 136 reduces below the predetermined threshold, the pair of springs 188, 190 bias the locking pawl 186 from the disengaged position to the engaged position. It should be noted that a moment applied by the tension "T2" may be typically greater than the torque applied by the springs 188, 190. However, the springs 188, 190 may be designed to apply a torque that is based on a value of the predetermined threshold, such that the springs 188, 190 rotate the shaft 180 along with the locking pawl 186 to the engaged position when the tension "T2" reduces below the predetermined threshold. Further, based on rotation of the locking pawl 186 to the engaged position, the teeth 198 of the lever 196 engages with one of the recesses 192 in order to prevent any relative movement between the movable mast section 132 and the fixed mast section 130.

Thus, the locking mechanism 184 may provide the back-up locking mechanism that locks the movable mast section 132 with the fixed mast section 130 in the event of failure of the primary mechanism 134. It should be noted that the locking mechanism 184 described herein may eliminate requirement of human intervention for locking the movable mast section 132 with the fixed mast section 130, thereby reducing any potential human errors. More particularly, the locking mechanism 184 may not have to be activated by an end user, instead, the locking mechanism 184 is activated when the tension "T2" in the cable 136 reduces below the predetermined threshold. Further, the locking mechanism 184 may eliminate any casualties to personnel and/or damage to equipment due to failure of the primary mechanism 134, thereby improving operational reliability of the fall protection system 100.

Figure 6:
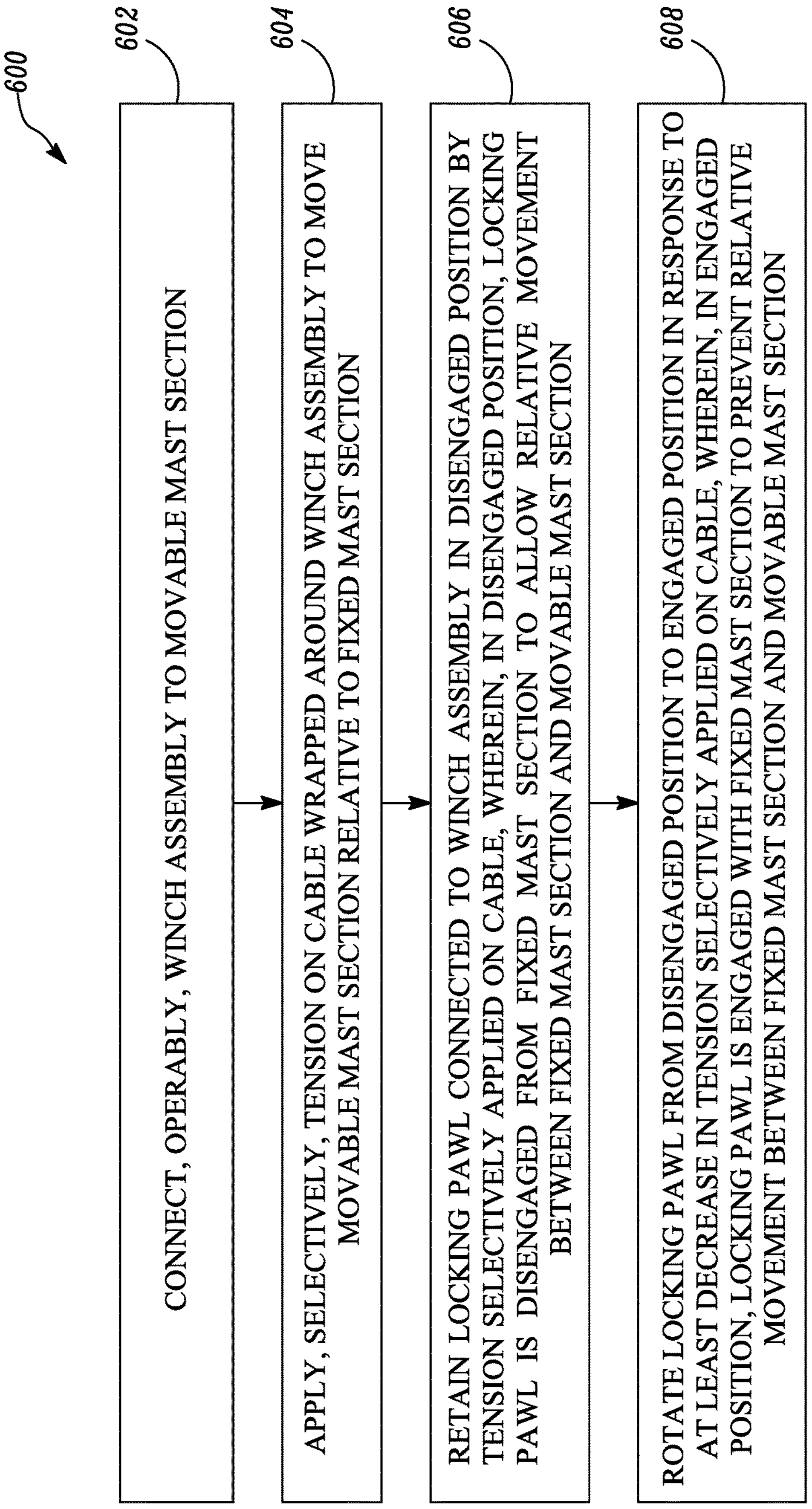
FIG. 6 is a flowchart for a method of operating the fall protection system.

FIG. 6 illustrates a flowchart for a method 600 of operating the fall protection system 100 including the fixed mast section 130 and the movable mast section 130. At step 602, the winch assembly 134 is connected to the movable mast section 132. More particularly, the winch assembly 134 is connected to the movable mast section 132 by connecting the mounting structure 174 to the movable mast section 132 and connecting the locking pawl 186 to the mounting structure 174. At step 604, the tension "T2" is selectively applied on the cable 136 wrapped around the winch assembly 134 to move the movable mast section 132 relative to the fixed mast section 130.

At step 606, the locking pawl 186 connected to the winch assembly 134 is retained in the disengaged position by the tension "T2" selectively applied on the cable 136. In the disengaged position, the locking pawl 186 is disengaged from the fixed mast section 130 to allow relative movement between the fixed mast section 130 and the movable mast section 132. At step 608, the locking pawl 186 is rotated from the disengaged position to the engaged position in response to at least a decrease in the tension "T2" selectively applied on the cable 136. In the engaged position, the locking pawl 186 is engaged with the fixed mast section 130 to prevent relative movement between the fixed mast section 130 and the movable mast section 132. Further, the locking pawl 186 is rotated from the disengaged position to the engaged position by the biasing of the at least one spring 188, 190.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A fall protection system comprising:

a mast assembly with a fixed mast section and with exactly one movable mast section;

exactly one winch assembly, operably connected to the movable mast section;

and a locking mechanism adapted to lock the movable mast section relative to the fixed mast section, the locking mechanism comprising:

a locking pawl connected to the winch assembly, wherein the locking pawl is adapted to rotate between an engaged position and a disengaged position; and wherein the locking pawl engages with the fixed mast section in the engaged position to prevent relative movement between the fixed mast section and the movable mast section; and at least one spring adapted to bias the locking pawl towards the engaged position; wherein the winch assembly is adapted to retain the locking pawl in the disengaged position against the biasing of the at least one spring based on a tension selectively applied by the winch assembly.

2. The fall protection system of claim 1, wherein the winch assembly includes a cable that selectively applies the tension by the winch assembly.

3. The fall protection system of claim 2, wherein the at least one spring is adapted to allow the locking pawl to rotate to the engaged position based on at least a decrease in the tension selectively applied by the cable.

4. The fall protection system of claim 1 further comprising a mounting structure, wherein the locking pawl and the at least one spring are connected to the mounting structure.

5. The fall protection system of claim 4, wherein the mounting structure is fixedly connected to the movable mast section.

6. The fall protection system of claim 1, wherein the fixed mast section includes at least one recess disposed on an outer surface thereof, wherein the locking pawl engages with the at least one recess in the engaged position.

7. The fall protection system of claim 1, wherein the movable mast section is movable based on an operation of the winch assembly.

8. The fall protection system of claim 1, wherein the at least one spring includes a pair of springs.

9. The fall protection system of claim 1, wherein the at least one spring is a torsion spring.

10. A fall protection system comprising:

a mast assembly with a fixed mast section and with exactly one movable mast section;

exactly one winch assembly, to the movable mast section; and a locking mechanism adapted to lock the movable mast section relative to the fixed mast section, the locking mechanism comprising:

a locking pawl connected to the winch assembly, wherein the locking pawl is adapted to rotate between an engaged position and a disengaged position, and wherein the locking pawl engages with the fixed mast section in the engaged position to prevent relative movement between the fixed mast section and the movable mast section;

at least one spring adapted to bias the locking pawl towards the engaged position; wherein the winch assembly is adapted to retain the locking pawl in the disengaged position against the biasing of the at least one spring based on a tension selectively applied by the winch assembly, and wherein the at least one spring is adapted to allow the locking pawl to rotate to the engaged position based on at least a decrease in the tension selectively applied by the cable.

11. The fall protection system of claim 10 further comprising a mounting structure, wherein the locking pawl and the at least one spring are connected to the mounting structure.

12. The fall protection system of claim 11, wherein the mounting structure is fixedly connected to the movable mast section.

13. The fall protection system of claim 10, wherein the fixed mast section includes at least one recess disposed on an outer surface thereof, wherein the locking pawl engages with the at least one recess in the engaged position.

14. The fall protection system of claim 10, wherein the movable mast section is movable based on an operation of the winch assembly.

15. The fall protection system of claim 10, wherein the at least one spring is a torsion spring.

* * * * *